United States Patent [19]
Levy

[11] Patent Number: 5,923,892
[45] Date of Patent: Jul. 13, 1999

[54] HOST PROCESSOR AND COPROCESSOR ARRANGEMENT FOR PROCESSING PLATFORM-INDEPENDENT CODE

[76] Inventor: Paul S. Levy, 2533 W. Gregg Dr., Chandler, Ariz. 85224

[21] Appl. No.: 08/958,052

[22] Filed: Oct. 27, 1997

[51] Int. Cl.[6] ....................................... G06F 15/17
[52] U.S. Cl. ................ 395/800.31; 395/800.34; 395/800.36; 395/200.38
[58] Field of Search ......................... 395/200.38, 200.39, 395/200.4, 200.41, 200.76, 800.31, 800.34, 800.36

[56] References Cited

U.S. PATENT DOCUMENTS

| | | | |
|---|---|---|---|
| 5,113,522 | 5/1992 | Dinwidd, Jr. et al. | 395/553 |
| 5,218,711 | 6/1993 | Yoshida | 395/800.34 |
| 5,764,908 | 6/1998 | Shoji et al. | 395/200.47 |
| 5,778,178 | 7/1998 | Arunachalam | 395/200.33 |
| 5,838,165 | 11/1998 | Chatler | 326/38 |

OTHER PUBLICATIONS

D. Evoy et al., U.S. Patent Application No. 08/757,151, Filed Nov. 27, 1996, entitled Master/Slave Multi–Processor Arrangement and Method Thereof, pp. 1–28.

*Primary Examiner*—William M. Treat

[57] ABSTRACT

A multiple processor circuit arrangement utilizes a host processor which controls the operational state of a coprocessor by programming internal control registers on the coprocessor. The host processor and coprocessor are coupled to an expansion bus, and the coprocessor is adapted to execute platform-independent code on behalf of the host processor. In addition, a stack-based processor utilizes a stack cache for accelerating stack access operations and thereby accelerating the overall performance of the processor. When the stack-based processor is utilized as the coprocessor in the aforementioned host/coprocessor computer system, the coprocessor is optimized to process platform-independent program code such as Java bytecodes, thereby permitting fast and efficient execution of both program code native to the master processor as well as platform-independent program code that is, effectively, native to the coprocessor.

36 Claims, 13 Drawing Sheets

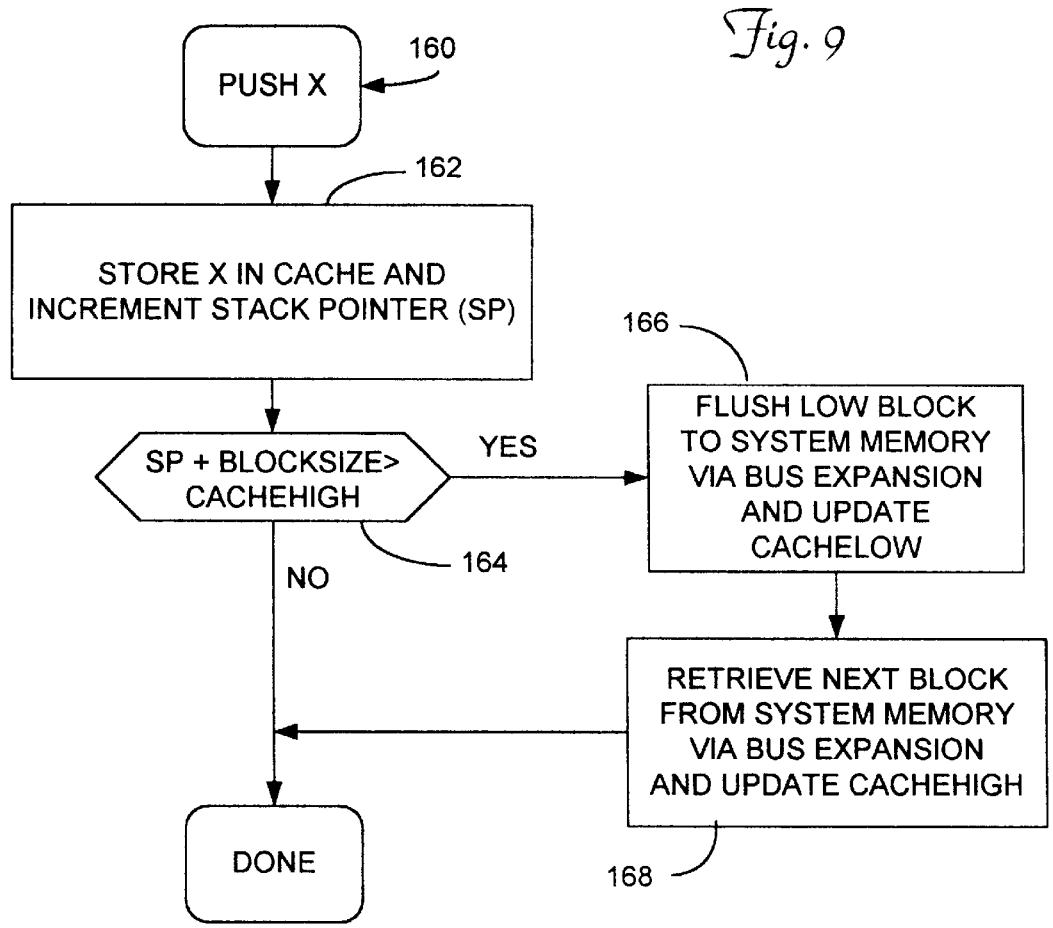

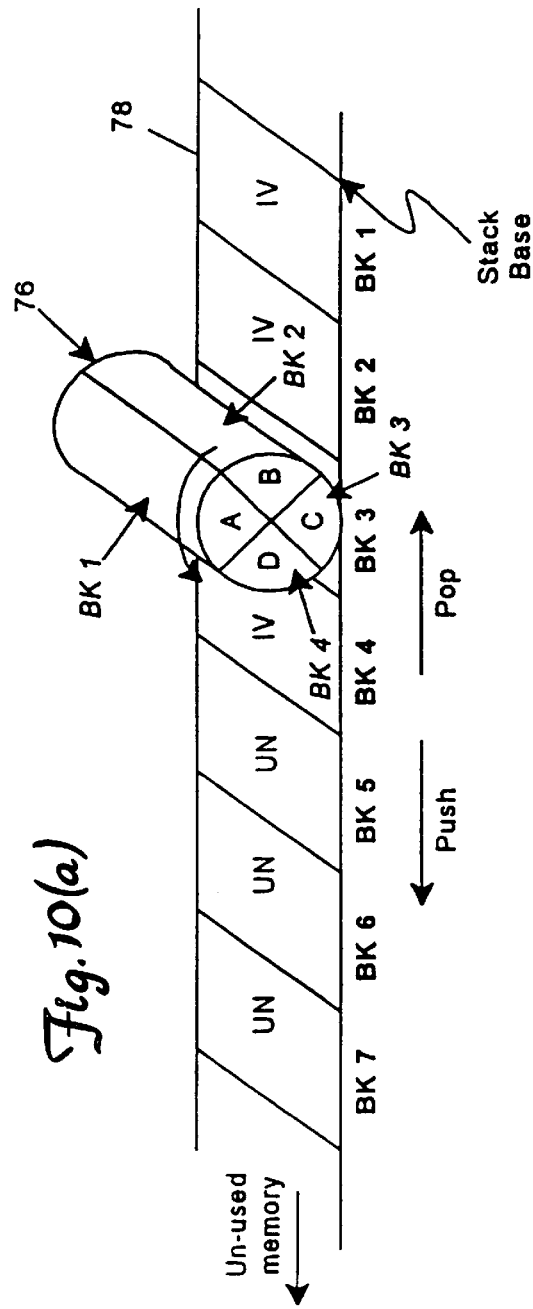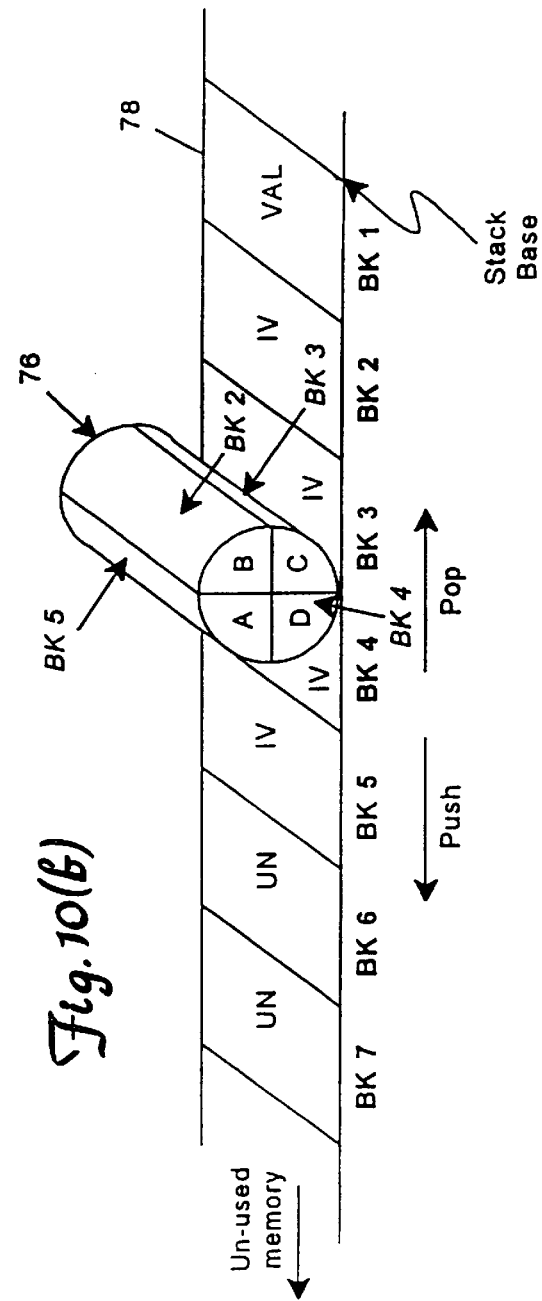

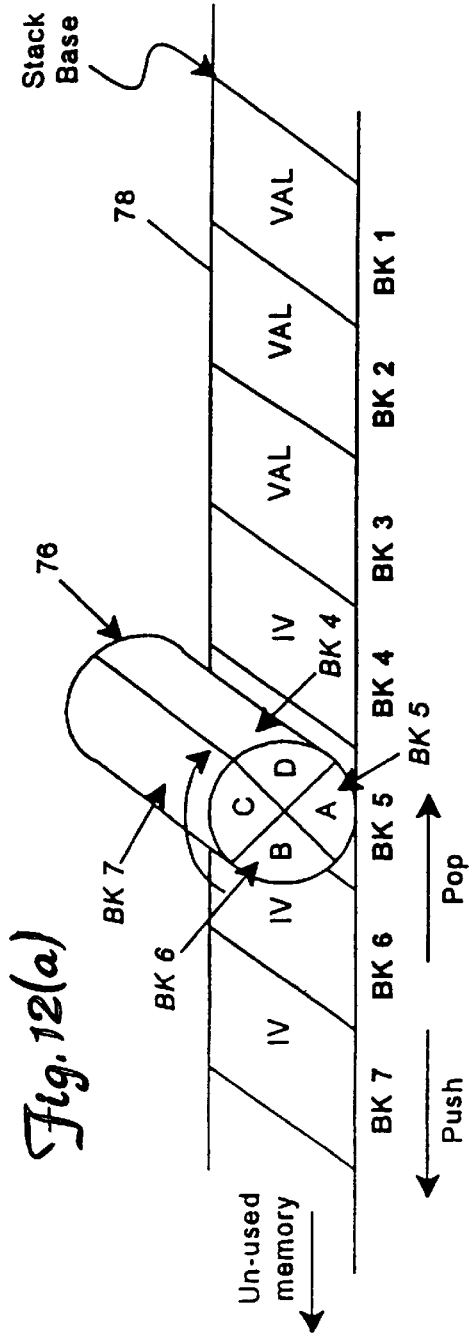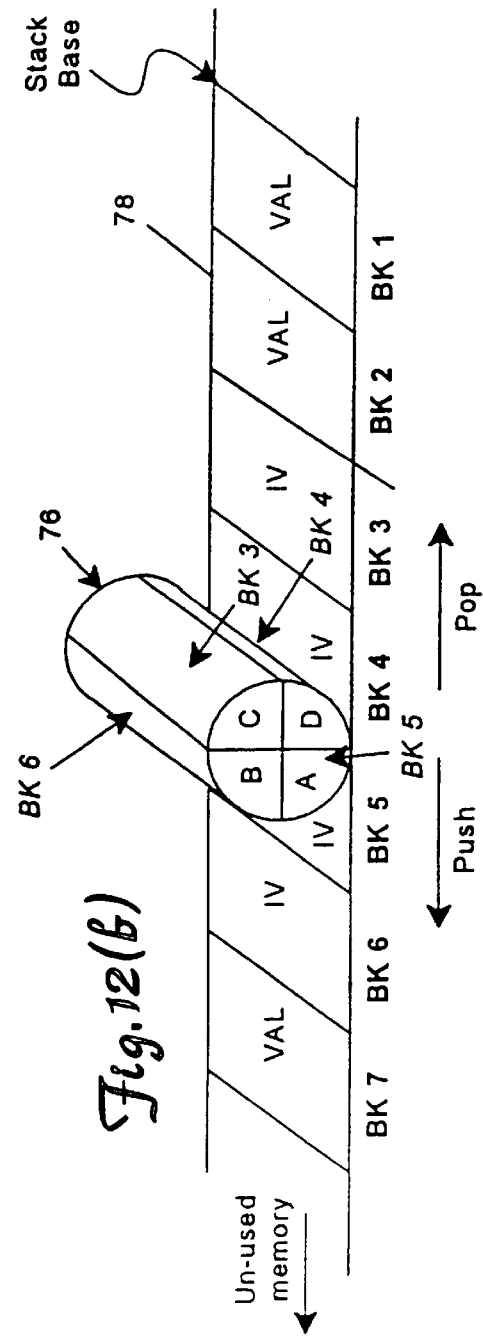

HOST PROCESSOR AND COPROCESSOR ARRANGEMENT FOR PROCESSING PLATFORM-INDEPENDENT CODE

FIELD OF THE INVENTION

The present invention relates to processor and coprocessor computing arrangements, and more particularly to a coprocessor coupled to an expansion bus of a computer system.

BACKGROUND OF THE INVENTION

Platform-independent programming languages, such as the "Java" programming language from Sun Microsystems, Inc., offer significant advantages over traditional, platform-specific languages. A platform-independent programming language typically utilizes platform-independent program code (machine-readable instructions) suitable for execution on multiple hardware platforms without regard for the particular instruction set for the hardware platforms. A hardware platform typically includes a computer system having one or more processors (e.g., microprocessors or microcontrollers) which execute a particular set of instructions having a specific format, sometimes referred to as a native instruction set. This is in contrast to platform-specific languages, which utilize platform-specific compilers to generate program code that is native to one particular hardware platform. While the same source code may in some instances be compiled by different platform-specific compilers into suitable program code for multiple platforms, the resulting program code is not platform-independent.

Most platform-independent program code is in an intermediate code format, since further processing is required to execute it on a specific hardware platform. For Java, for example, the intermediate codes are referred to as bytecodes. Typically, a compiler is used to generate a series of intermediate codes from a source file. The intermediate codes are then executed by a software interpreter which converts them into native instructions for the computer system on the fly. Consequently, the intermediate codes are executable on any computer system having a suitable interpreter.

Many platform-independent program codes are relatively compact, which makes them readily suited for downloading over a network or modem. Moreover, since the program code is platform-independent, the downloading computer system (or server) can download the same program code irrespective of the particular hardware platform of the executing computer system (or client). Consequently, platform-independent program codes such as Java are expected to enjoy immense popularity for the distribution of software programs over the Internet. Typically, platform-independent software programs downloaded from the Internet are in the form of applets which execute within a web browser. It should be understood, however, that platform-independent program code has many other uses, including in stand-alone applications, operating systems, and real-time embedded systems, among others.

One problem with platform-independent program code, however, is that the program code must be interpreted during run time, which significantly reduces execution speed compared to program code native to a particular hardware platform. Some Java interpreters, for example, may require up to 50 processor clock cycles to process each bytecode, compared to typically one clock cycle for most native instructions.

As an alternative to run time interpretation, software-based just-in-time (JIT) compilers have been developed to optimize interpretation of platform-independent program code, typically by emulating the functionality of the platform-independent code using native code. While execution speed is increased over simple runtime interpretation, the platform-independent program code is still slower than native code, and additional memory space is required to store the compiler code.

At the other extreme, dedicated processors (e.g., for Java, the picoJAVA, microJAVA and UltraJAVA processors from Sun Microelectronics) have been proposed to utilize platform-independent instructions as their native instruction set. While these processors may have the capability of running platform-independent program code as fast as other native program codes for other hardware platforms, the processors suffer from the same problems as any other processor when executing non-native program code.

Moreover, because many of the architectures for dedicated processors are stack-based, significant performance limitations exist in these processors since frequent memory accesses are required to access a stack. Much of the computer industry has moved away from stack-based architectures in part due to the memory and performance bottlenecks presented by the use of a stack.

It is estimated that in the future as much as 50% or more of the program code run on any particular hardware platform may be platform-independent. However, a large portion of program code is expected to be platform specific. Consequently, a substantial need exists for a manner of accelerating the execution of platform-independent program code on a hardware platform without adversely impacting the execution speed of native program code thereon.

SUMMARY OF THE INVENTION

In accordance with one aspect of the invention, a coprocessor includes an expansion bus interface circuit for coupling to an expansion bus. The coprocessor also includes an instruction cache which is coupled to the expansion bus interface circuit. The instruction cache provides cache storage for platform-independent code executed by the coprocessor. An internal control register is coupled to the interface circuit and has an input port for providing external access thereto. The control register provides an operational state for the coprocessor. The coprocessor also has a program counter that is coupled to the interface circuit. The program counter is accessible to other processors via the expansion bus. Thus, another processor, such as a host processor, can direct execution of platform-independent code by the coprocessor.

In accordance with another aspect of the invention, a computer system is provided that includes a host processor and a coprocessor. The host processor controls overall operation of the computer system and directs the coprocessor to execute platform-independent code. The computer system also includes a local bus, an expansion bus, and a bridge that couples the local bus to the expansion bus. The host processor is coupled to the local bus, and the coprocessor is coupled to the expansion bus. When the computer system receives platform-independent code to execute, the host processor activates the coprocessor and informs the coprocessor of the address in system memory where the platform-independent code is located. The coprocessor, in response, reads the platform-independent code from system memory and executes the code.

The invention is advantageous in that the performance of a computer system may be enhanced, and a computer system may be easily upgraded to take advantage of the performance gain. The invention enhances computer system performance by offloading execution of platform-independent code from the host processor to a coprocessor. The coprocessor may be a general purpose processor or configured to optimally process the platform-independent code. Thus, system performance may be improved by freeing the host processor to perform other tasks while the coprocessor is executing the platform-independent code.

The coprocessor circuit arrangement, being adapted to couple to an expansion bus, may be easily installed in a computer system by an end user. Because expansion buses are designed to accommodate the addition of new devices to computer systems, the coprocessor circuit arrangement offers a straightforward upgrade path for computer systems. Stated differently, the invention saves an end user from having to purchase an entire new computer system to achieve the performance advantages offered by the invention.

The above summary of the present invention is not intended to describe each illustrated embodiment of the present invention. This is the purpose of the figures and the detailed description which follow.

BRIEF DESCRIPTION OF THE DRAWING

Other aspects and advantages of the invention will become apparent upon reading the following detailed description and upon reference to the drawings in which:

FIG. 9 is a push routine executed on the cache controller of FIG. 3;

FIGS. 10(a) and 10(b) are functional diagrams illustrating an example interaction of the stack cache with the stack respectively before and after execution of the push routine of FIG. 9;

FIGS. 12(a) and 12(b) are functional diagrams illustrating an example interaction of the stack cache with the stack respectively before and after execution of the pop routine of FIG. 11; and FIG. 13 is a functional diagram illustrating an example interaction of the stack cache with the stack after a stack flush operation.

Figure 1:
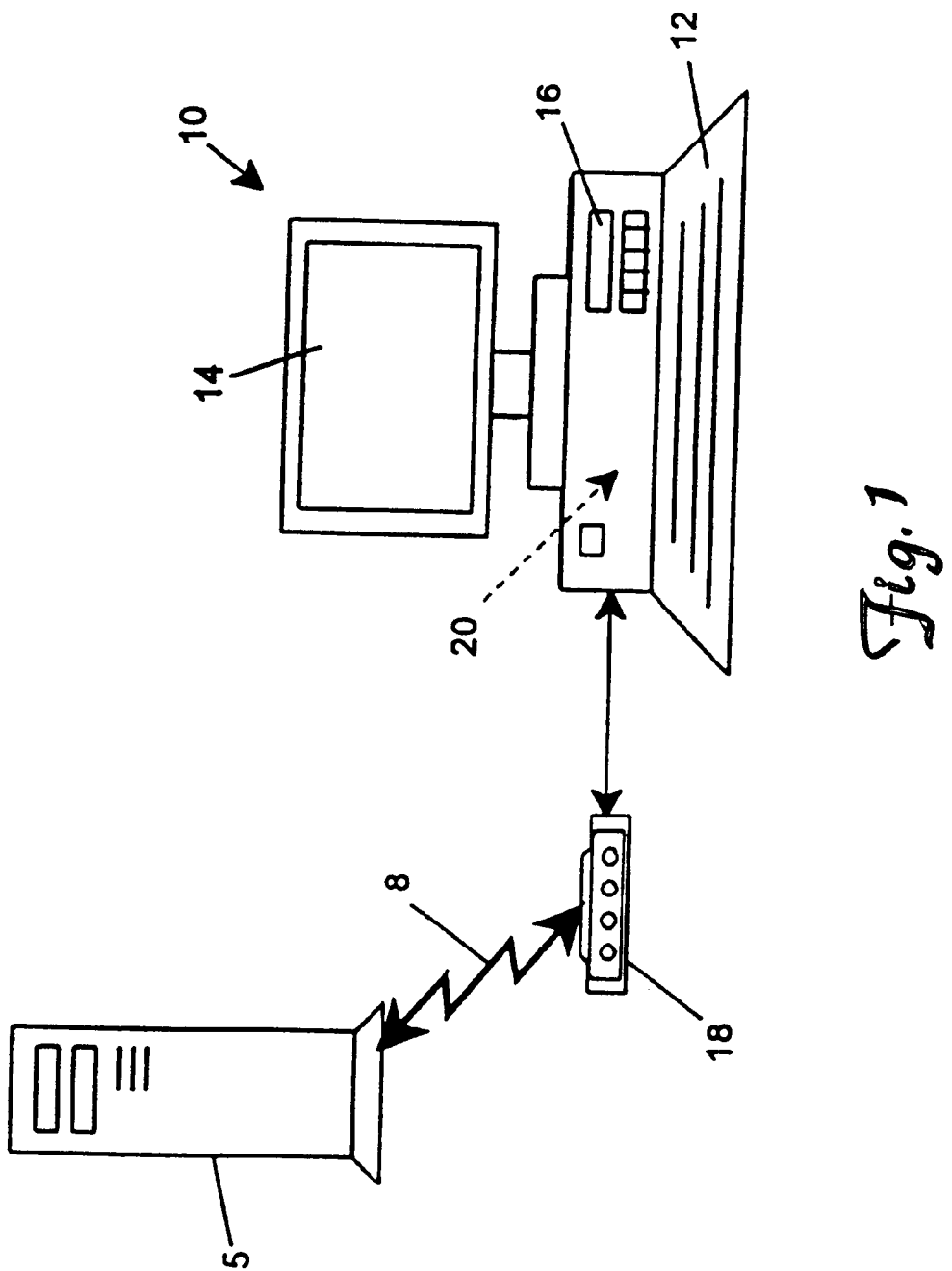
FIG. 1 is a functional diagram of a computer system, according to one embodiment of the present invention, coupled to an external server over a network.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DESCRIPTION OF THE ILLUSTRATED EMBODIMENTS

The present invention is believed to be applicable to a variety of systems and arrangements which process platform-independent code. The invention has been found to be particularly advantageous in application environments where a computer system receives platform-independent code from a source external to the computer system and interprets and performs the fictions specified by the platform-independent code. While the present invention is not so limited, an appreciation of various aspects of the invention is best gained through a discussion of application examples operating in such an environment.

Turning to the drawings, FIG. 1 illustrates a computer system 10 according to one embodiment of the present invention. Computer system 10 is, for example, a desktop computer (e.g., based upon a Macintosh or Intel x86 platform) or UNIX workstation having a user input device 18 such as a keyboard and/or mouse, video display or monitor 14, and mass storage 16. Computer system 10 also includes a communications interface such as modem 18 or a network connector for coupling to one or more servers such as server 5 over a network 8. Network 8 is, for example, a private LAN or WAN, a bulletin board system, or a public network such as the Internet.

It is typically over network 8 that computer system 10 is likely to receive platform-independent program code, since often the servers coupled to computer system 10 over network 8 cannot detect the particular hardware platform of the system, and since it is often desirable for the servers to only have to download one version of program code for a given application. However, it should be appreciated that platform-independent program code may be received by computer system 10 in any number of alternate manners, including removable storage devices such as floppy disks, CD-ROM's, magnetic tape, and flash memories, etc. Moreover, platform-independent program code may be initially stored in computer system 10, e.g., in ROM's and other non-volatile devices, on hard drives, etc. It should also be appreciated that the platform-independent program code executed by computer system 10 may include any type of computer program, including stand-alone applications, operating systems, embedded applications, etc., as well as applets which are executed within a web browser.

In another specific embodiment, computer system 10 is implemented as a network computer (NC) which has little or no mass storage and which principally executes applications downloaded from server 5. With a network computer, a substantial portion of the program code executed by the computer is typically platform-independent. Thus, this type of application particularly benefits from the performance enhancements offered by the various embodiments of the invention.

Computer system 10 may also be any of a number of other computer or data processing systems in which platform-independent program code may be utilized, including various network servers, minicomputers, mainframe computers, workstations, desktop computers, laptop computers, mobile computers, embedded controllers, etc.

Multi-processor Interface

Specific embodiments which implement this aspect of the invention generally operate by utilizing multiple processors interfaced in a host processor/coprocessor relationship whereby a host processor is capable of setting the operational state of a coprocessor. In certain embodiments, this is accomplished by writing data into an internal control register arrangement including control registers and/or control flags in the coprocessor to start the coprocessor with a predetermined set of initial conditions from which the coprocessor executes. The coprocessor, when started, operates in accordance with the initial operational state information pre-loaded into the coprocessor by the host processor.

The internal control register arrangement set by the host processor may include one or more of the following: program counter (PC) register, instruction (IR) registers, stack pointer register, frame pointer register, variable pointer registers, memory address registers, status registers, accumulator registers, index registers, and data registers, among others. In some embodiments, the host processor also sets control flags, such as zero, carry, negative, interrupt/ exception, break, decimal, and overflow flags (among others), many of which are typically grouped together in the same status register. The host processor in another specific embodiment is also capable of setting the initial state and contents of a stack (if one exists in the coprocessor).

The host processor and coprocessor may be similar or identical processors, or alternatively may be dissimilar processors, which often permits each processor to be optimized to perform different tasks which the host processor then allocates between the processors. In one embodiment, the host processor is a load/store architecture RISC processor and the coprocessor is a stack-based processor.

In one specific embodiment of the invention, the coprocessor is optimized to process platform-independent program code, e.g., Java bytecodes, thereby leaving the host processor to handle native program code for which it is optimized. By partitioning execution of each type of program code to a processor optimized to process the program code, the overall performance of the system is optimized irrespective of which type of program code is executed thereon. While much of the discussion herein will focus on platform-independent code and the Java programming language, the present invention is not necessarily limited to any particular programming language or instruction set.

Figure 2:
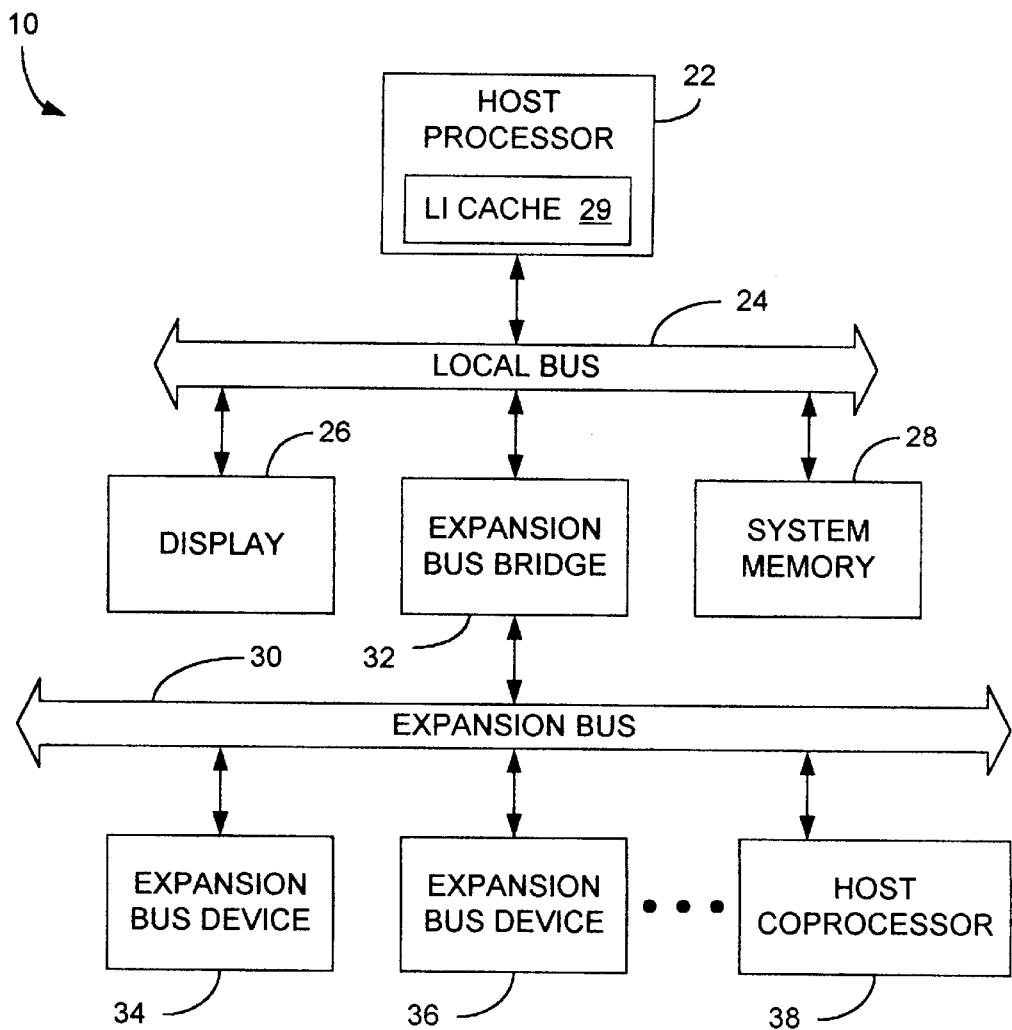
FIG. 2 is a functional block diagram of a portion of the circuit board in the computer system of FIG. 1, including an expansion bus-based coprocessor.

FIG. 2 is a functional block diagram of computer system 10, including an expansion bus-based coprocessor. The system 10 includes a host processor 22 coupled to a local bus 24, the local bus including both address and data lines (not shown). The local bus 24 couples host processor 22 to a display device 26 and system memory 28. The host processor 22 may be any one of a variety of conventional processors, including CISC, RISC, and stack-based processors. The exemplary host processor 22 includes a level-one cache 29.

The system also includes an expansion bus 30 that is coupled to the local bus 24 via expansion bus bridge 32. The expansion bus 30 may be any one of a variety of expansion buses such as ISA, EISA, Micro Channel, or PCI. The invention may also be utilized in CardBus applications. The exemplary embodiment described herein utilizes a PCI expansion bus. PCI stands for Peripheral Component Interconnect, and the bus is defined in specifications now managed by the PCI Special Interest Group of Portland, Oreg. The expansion bus bridge 32 may be a commercially available PCI bridge implemented according to the PCI specification, such as the VL82C59x chipset from VLSI Technology, Inc.

The expansion bus 30 supports burst transfers of data between the host processor 22 and expansion bus devices 34, 36, and 38 coupled to the bus, and coprocessor 38 is an expansion bus device whose function is to process platform-independent code received by the computer system 10. Coprocessor 38 is activated and deactivated by the host processor 22. When platform-independent code is received by the computer system 10, the host processor 22 activates coprocessor 38. Coprocessor 38 reads the code from system memory 28, executes the instructions, and writes any results back to memory 28 or updates display 26. Those skilled in the art will recognize that many other functions may be specified by the platform-independent code, both input/ output and otherwise. Termination of execution of platform-independent code by coprocessor 38 may occur either by interruption by the host processor 22 or upon completion of execution by the coprocessor.

Various advantages result from the architecture of the present invention. First, coprocessor 38 may be specifically implemented to execute the platform-independent code. Thus, the coprocessor 38 may execute the code much faster than the host processor 22. Also, execution of the platform independent code by the coprocessor 38 may free the host processor 22 to perform other tasks, thereby improving system performance. Second, a computer system having an expansion bus may be upgraded to include a coprocessor 38 for processing platform-independent code. The coprocessor 38 is plug-compatible with the expansion bus 30, and the procedures by which the host processor 22 controls coprocessor 38 may be set forth in software which is executable by the host processor 22. Thus, the upgrade may consist of conventional hardware and software installation procedures, and users of computer systems need not replace entire systems to achieve a system performance enhancement.

Figure 3:
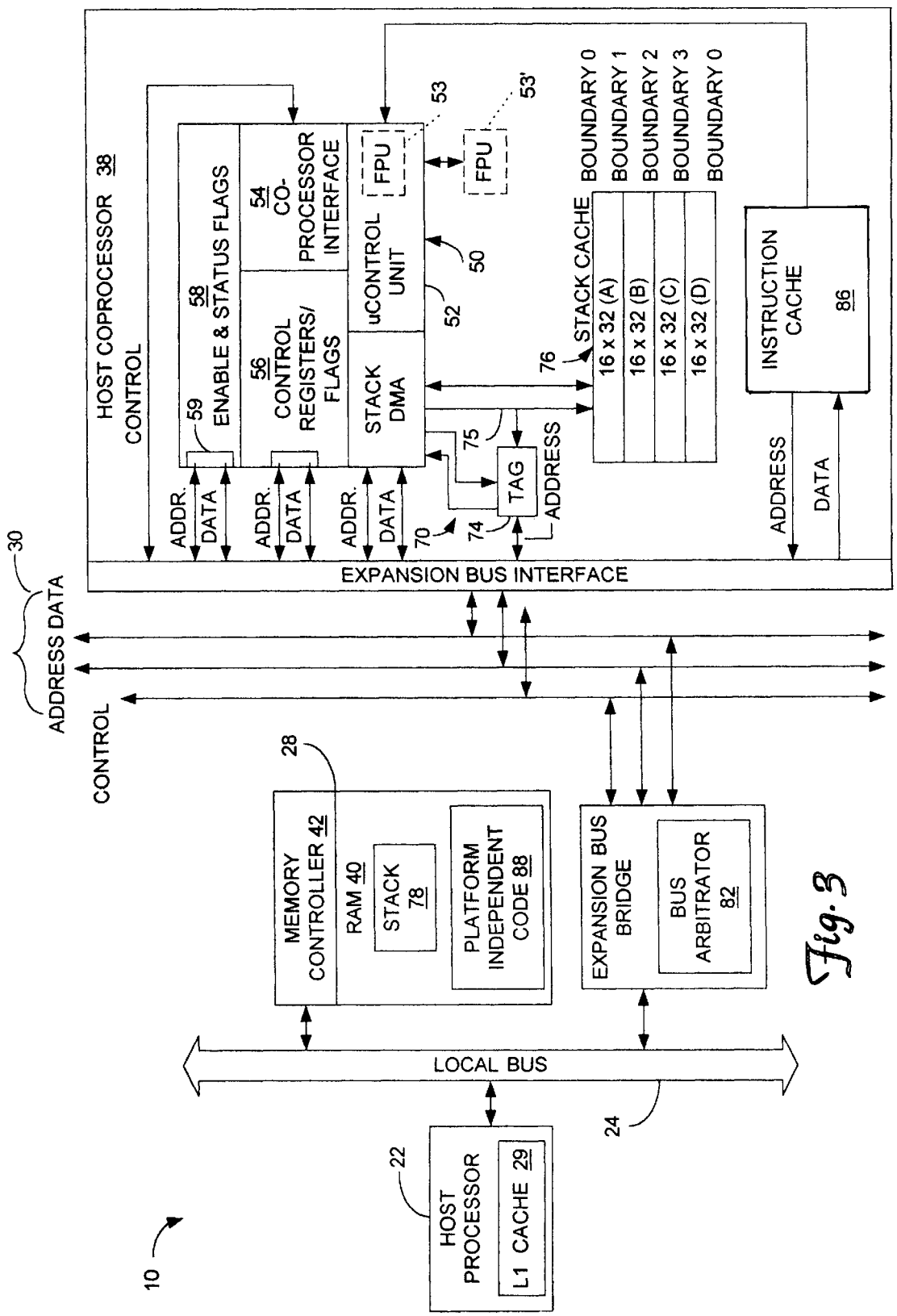
FIG. 3 is a functional block diagram of the coprocessor relative to the computer system of FIG. 2.

FIG. 3 illustrates a specific embodiment of computer system 10 in greater detail. As shown in this figure, computer system 10 includes a circuit arrangement shown in the form of host processor 22 coupled to a system memory 28 over a local bus 24. System memory 28 includes RAM 40, which is controlled by a memory controller 42. Other memory devices, e.g., ROM's and the like, are not shown in this figure. It will be understood that various memory configurations, including various combinations of volatile and non-volatile storage, may be used in the alternative.

Coprocessor 38 in one embodiment is optimized to process platform-independent program code such as Java bytecodes. Processor 38 includes a microcoded control unit (uControl) 52 which is designed to directly implement the Java Virtual Machine 1.0 Beta specification released by Sun Microsystems, Inc., which is incorporated by reference herein. In the illustrated embodiment, not all of the Java bytecodes are implemented in control unit 52, as it is believed that roughly 90% of Java bytecodes could be implemented in about ¼ the code required to implement the remaining 10%. For these non-handled instructions, control unit 52 triggers an exception to notify the host processor of the need to halt coprocessor 38 and handle the non-handled instruction.

For example, Java instructions such as array allocation operations (e.g., anewarray and multianewarray) and method invocation operations (e.g., invokevirtual, invokenonvirtual, invokestatic and invokeinterface) can be particularly code-intensive to implement, and are often not executed as commonly as other instructions. In the illustrated embodiment the coprocessor 38 triggers an exception in response to these instructions so that they can be handled by the host processor 22.

In some embodiments it is desirable to permit host processor 22 to handle floating point operations (e.g.,fadd, dadd, fsub, dsub, fdiv, ddiv, fifem, and dmem), since many processors utilize floating point units, or coprocessors, to accelerate the handling of these types of calculations. In other embodiments, it is desirable to code floating point operations into control unit 52, possibly utilizing a separate floating point unit (FPU) which is internal to the control unit (e.g., FPU 53 shown in FIG. 3), or implemented as a separate coprocessor that is coupled to coprocessor 38 (e.g., FPU 53' shown in FIG. 3). In either event, the FPU would be able to grab floating point operations processed by coprocessor 38 in a manner known in the art. The FPU in one embodiment is a fully functional floating point unit, e.g., implementing the IEEE 754 standard. In other embodiments, the FPU is Java-specific, with any floating point operations not supported by the Java Virtual Machine Specification (e.g., trig and square functions) eliminated, thereby decreasing the complexity of the FPU.

In other embodiments, the entire Java instruction set is implemented in coprocessor 38. Implementation of the Java Virtual Machine architecture, is conventional and need not be discussed in any greater detail herein.

Control unit 52 relies on a number of internal control registers and flags designated in internal control register arrangement block 56 which define the operational state of coprocessor 38, and which are accessible to host processor 22 through a control register access port 57 coupled to expansion bus 30. In the illustrated embodiment, this block includes a program counter (PC) register which contains the address of the next bytecode to be executed, a variable pointer (vars) register which points to a set of variables, an operand stack pointer (optop) register which points to the top of the operand stack, a stack base address register which points to the base address of the operand stack, and a frame pointer (frame) register which points to the execution environment structure. In addition, this block includes a number of flags, e.g., the flags implemented in the Java Virtual Machine architecture. Other stack cache related registers and/or flags may also be included in this block, as discussed below.

An additional group of external flags are found in Enable & Status Flags block 58 which are always accessible by host processor 22 (through enable & status flag access port 59 coupled to bus 30) to handle the interaction between the host processor 22 and coprocessor 38. Block 58 includes an Enable flag which switches coprocessor 38 between halt and run modes (described below), and further controls access by the host processor 22 to the internal control registers and flags in block 56. Block 58 also includes an instruction trap flag that is utilized by host processor 22 to determine when a platform-independent instruction cannot be processed by coprocessor 38, as well as a task complete flag that is utilized by host processor 22 to detect when the coprocessor has successfully completed its task.

Memory transfers with coprocessor 38 are handled by a cache controller 70 including a stack direct memory access unit (DMA) 72 coupled to expansion bus 30 as well as a separate stack cache 76 (discussed below). A tag unit 74 is utilized by DMA 72 to handle stack accesses to the stack cache (also discussed below). Data lines 73 couple DMA 72 to stack cache 76, while address lines 75 couple DMA 72 to stack cache 76 and tag unit 74. Stack DMA block 72 accesses the stack 78 stored in the RAM 40.

As shown in FIG. 3, blocks 56 and 58 are coupled to expansion bus 30 through separate access ports 57, 59 because block 56 is capable of being "locked-out" from access by host processor 22. Block 56 may be locked-out by using three state buffers in access port 57 that are controlled or gated via the enable flag in block 58, or alternatively, block 56 may be considered locked-out from host processor 22 due to coprocessor 38 asserting control over expansion bus 30 through bus arbitrator 82. The direct access ports 57, 59 coupled to expansion bus 30 are utilized by host processor 22 to control and monitor coprocessor 38, and it is desirable to prevent host processor 22 from modifying the control registers and flags of coprocessor 38 when the coprocessor is running. However, to ensure the ability of the host processor 22 to control coprocessor 38, block 58 is not similarly locked-out. Other manners of accessing blocks 56, 58, including dedicated data or I/O ports or dedicated control lines, may also be used.

Coprocessor 38 also includes a coprocessor interface block 54 which generates interrupts that are selectively passed to host processor 22 along with other system interrupts in a manner known in the art. Bus arbitrator 82 handles arbitration of expansion bus 30 between processors 22 and 38, as well as any other devices coupled to the bus (not shown), also in a manner known in the art. In general, only one device is given control of bus 30 at a time, typically by asserting a REQ signal and receiving back a GRANT signal from bus arbitrator 82. Bus arbitrator 82 may be a simple first-come first-served arbitrator, or may alternatively grant priority to host processor 22 to enable pre-emptive control by the host processor.

Coprocessor 38 also includes an instruction cache 86 for caching portions of the platform-independent code 88 from RAM 40. The instruction cache 86 includes both control and storage elements (not shown) and is coupled to the address and data lines of expansion bus 30. The control unit 52 of the coprocessor 38 is coupled to the instruction cache 86 for fetching instructions therefrom. The instruction cache 86 operates in a manner known to those skilled in the art.

Figure 4:
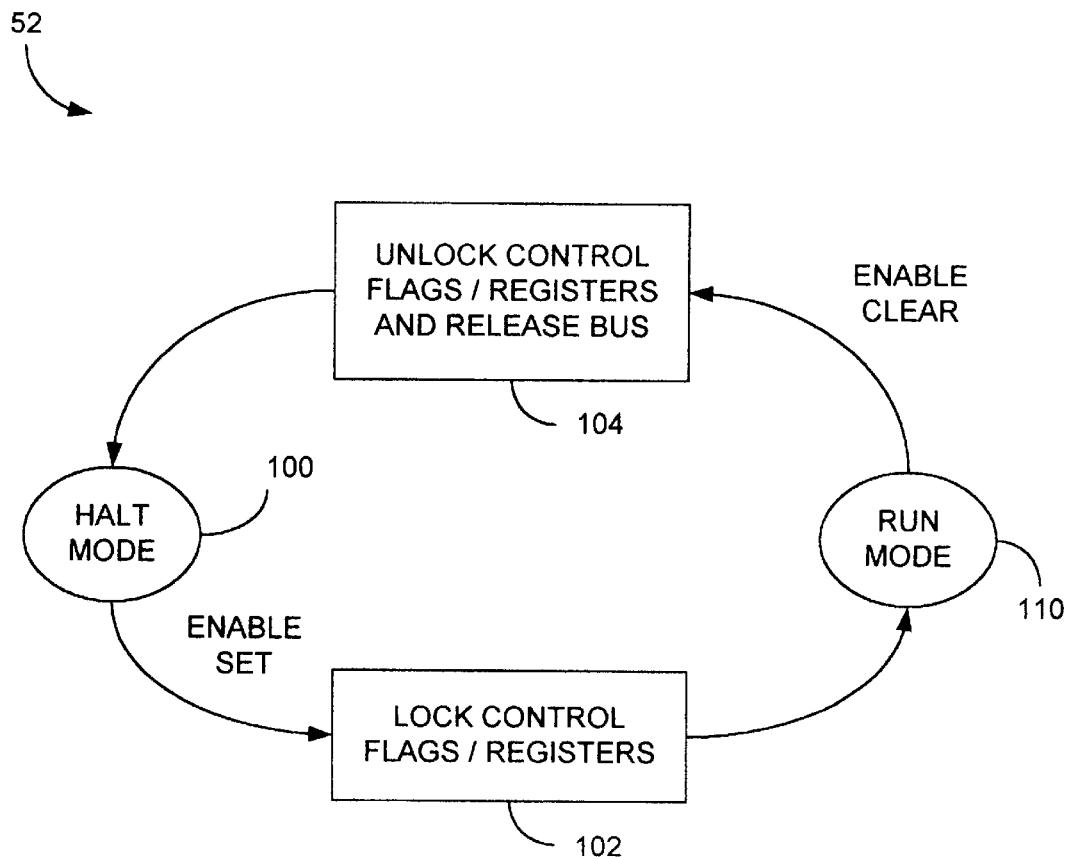
FIG. 4 is a state diagram illustrating certain operational modes for the coprocessor of FIG. 2.

FIG. 4 is a state diagram illustrating certain operational modes for the coprocessor of FIG. 2. Coprocessor 38 is switchable between two modes, a halt mode 100 and a run mode 110, based upon the state of the enable flag in block 58. When the coprocessor 38 switches to run mode, the internal control registers and/or flags in internal control register arrangement block 56 are locked-out as shown by block 102. Similarly, when the coprocessor 38 switches to halt mode, the control registers and/or flags in block 56 are unlocked as shown by block 104. In addition, control of expansion bus 30 by coprocessor 38 is released when the coprocessor is switched to halt mode (which typically means simply that the REQ line to bus arbitrator 82 is released).

Figure 5:
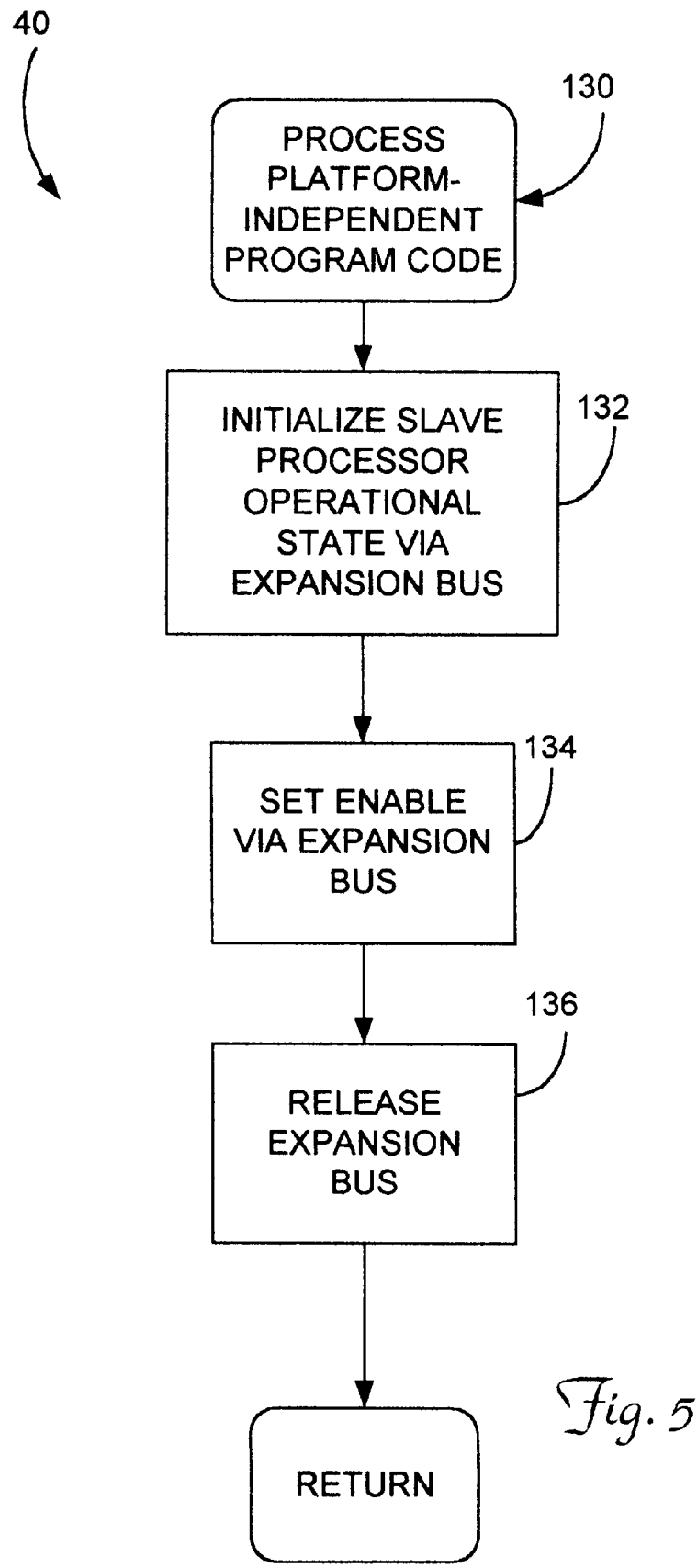
FIG. 5 is a flowchart illustrating one way, consistent with the present invention, to implement a program flow of a platform-independent program code processing routine executed on the master processor of FIG. 2.

Coprocessor 38 is stopped and started by host processor 22 primarily by controlling the enable flag in block 58, e.g., as shown by the platform-independent program code processing routine 130 in FIG. 5. Routine 130 is executed by host processor 22 whenever the processor detects (e.g., during loading) that platform-independent program code such as Java bytecodes are going to be processed.

To enable coprocessor 38 to process platform-independent program code, routine 130 first initializes the operational state of coprocessor 38 in block 132 by writing suitable data into the internal control register arrangement in block 56 through port 57. The control registers and flags are written to using well known data transfer operations via the expansion bus, for example, PCI bus operations. In one embodiment, a "snapshot" of the desired initial state of coprocessor 38 is maintained in system memory 28, modified as desired by host processor 22, and then copied directly to an address space mapped directly to the control registers and flags in coprocessor 38. Moreover, in other embodiments multiple operational states for coprocessor 38 are maintained by host processor 22 to enable the host processor to immediately switch the context of coprocessor 38 to perform other tasks.

In many situations, host processor 22 maintains a memory-mapped copy of the control registers and flags and simply starts execution of a block of platform-independent program code by coprocessor 38 by placing the starting address of the program code in the program counter register. In addition, operands necessary for execution of the program code are stored in the coprocessor stack (which is discussed below), with suitable modifications to the optop register.

Next, in block 134, host processor 22 sets the enable flag in block 58 via expansion bus 30, to switch coprocessor 38 from its halt mode to its run mode (FIG. 4). Next, in block 136, control over expansion bus 30 is released by host processor 22, thereby permitting coprocessor 38 to begin execution (as discussed below). Next, routine 130 terminates to enable host processor 22 to process additional code.

Figure 6:
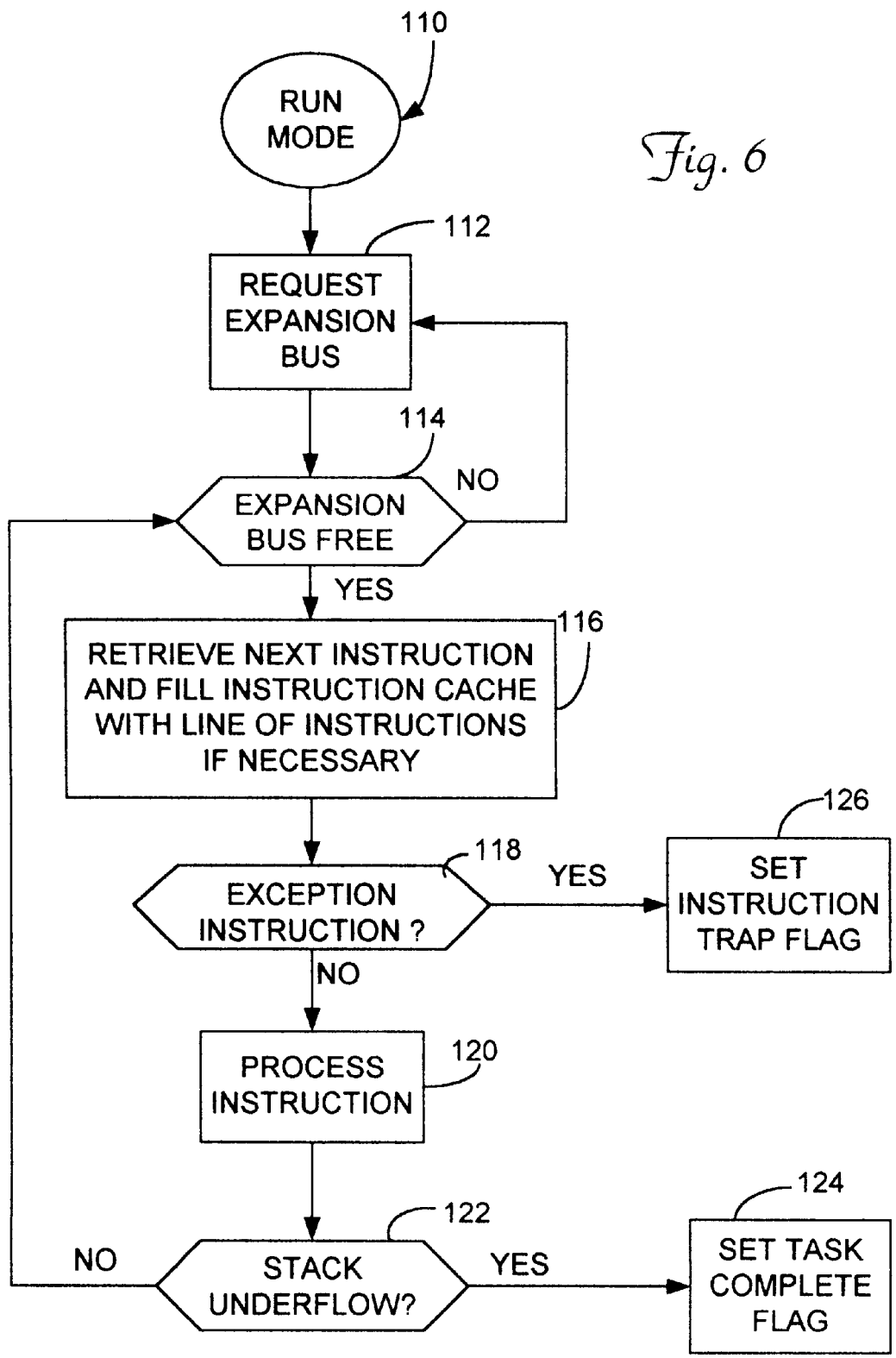
FIG. 6 is a flowchart illustrating one way, consistent with the present invention, to implement a program flow of the run mode for the coprocessor of FIG. 3.

FIG. 6 is a flowchart illustrating one way, consistent with the present invention, to implement a program flow of the run mode for the coprocessor of FIG. 3. Run mode 110 reflects the main processing loop that is entered once the enable flag in block 58 is set by host processor 22 (in block 134 of FIG. 5), and after the internal control registers and flags in block 56 have been locked-out (as in FIG. 4). In blocks 112 and 114, coprocessor 38 attempts to establish itself as master of expansion bus 30 by asserting its REQ line to bus arbitrator 82. Typically, control over the bus will be granted to coprocessor 38 after the bus is released by host processor 22 (e.g., in block 136 of FIG. 5). As discussed above, in an alternative embodiment the control registers and flags in block 56 are not locked-out from host processor 22 until after control over the expansion bus 30 is granted to coprocessor 38.

Next, in block 116, the platform-independent instruction pointed to by the program counter is retrieved from instruction cache 86. If the next instruction is not in the instruction cache 86, a line of instructions is read from RAM 40 via the expansion bus 30. In block 118, the instruction is tested to determine whether it is implemented in the coprocessor 38. As discussed above, certain instructions are omitted in some embodiments to simplify coprocessor 38, particularly instructions which are code-intensive but are not executed frequently. In these instances, an exception is signaled to enable host processor 22 to regain control of the expansion bus 30 and process the instruction through software interpretation. The exception is handled in block 126 by setting the instruction trap flag in block 58 of processor 38, which is decoded by dedicated logic in co-processor interface 54 to signal an interrupt to host processor 22. Alternatively, in another embodiment the interrupt is positively asserted in block 126.

If the currently-processed instruction is not an exception instruction, control passes from block 118 to block 120 where the instruction is processed in accordance with the Java Virtual Machine Specification. Next, in block 122 a stack underflow condition is tested, which occurs when the task or routine allocated to the coprocessor 38 has been completed and the last return call has been processed. When this condition is not indicated, control passes to block 112 to continue processing the next instruction in the platform-independent program code. If, however, the condition is indicated, control passes instead to block 124 where the task complete flag in block 58 is set. Coprocessor interface 54 also includes dedicated logic to signal an interrupt to host processor 22. Alternatively, in another embodiment the interrupt is positively asserted in block 124.

Figure 7:
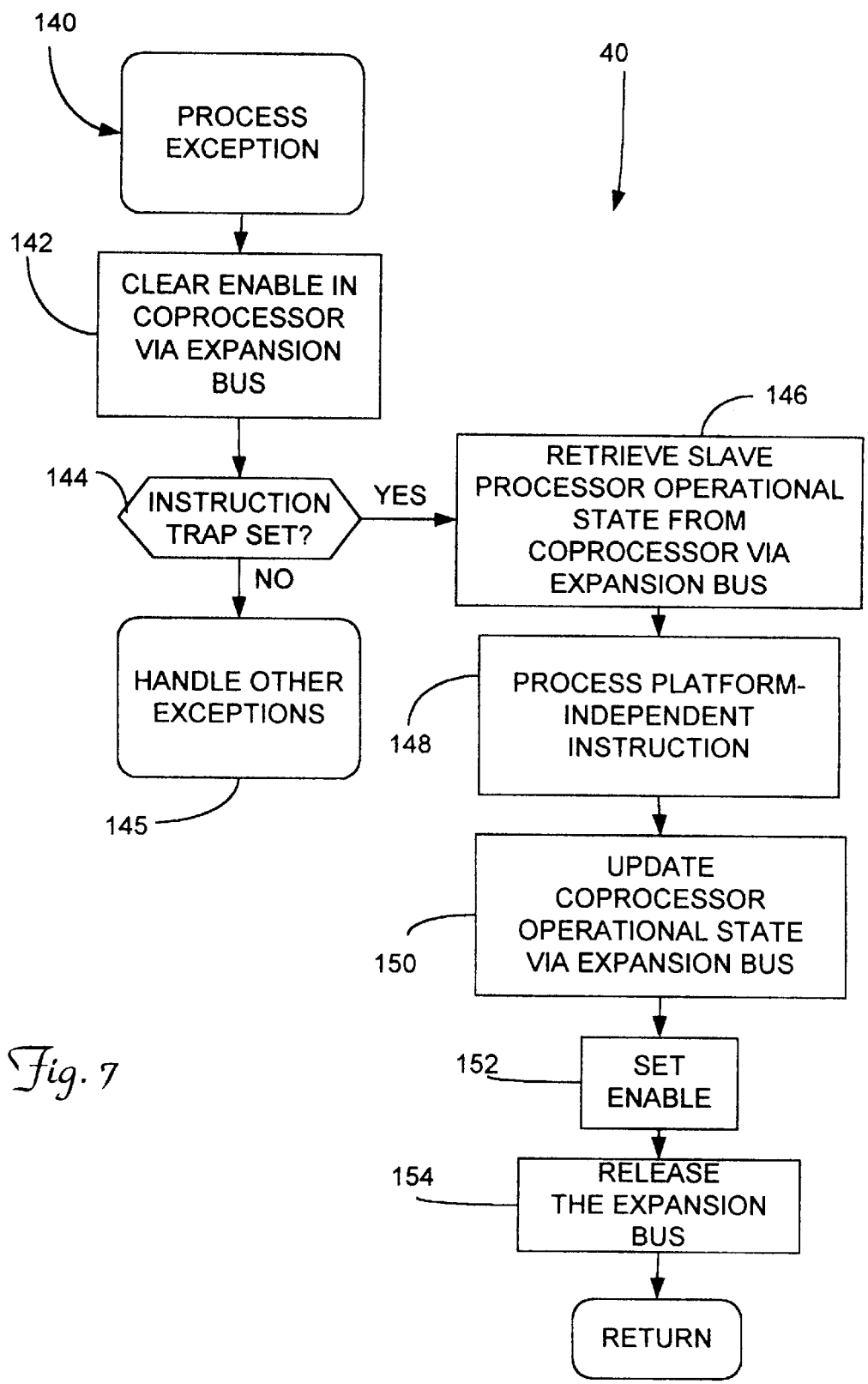
FIG. 7 is a flowchart illustrating one way, consistent with the present invention, to implement a program flow of an exception processing routine executed on the host processor of FIG. 3.

Host processor 22 handles exception instructions through an exception processing routine 140, a relevant portion of which is illustrated in FIG. 7. Whenever an exception (interrupt) is detected by the host processor 22, control passes to this routine, where in block 142 the enable flag in block 58 of coprocessor 38 is cleared via expansion bus 30. As shown in FIG. 4, this has the effect of switching coprocessor 38 to halt mode 100. Next, in block 144, the instruction trap flag in block 58 of coprocessor 38 is tested to determine whether coprocessor 38 signaled the interrupt due to the need to process an exception instruction. If this flag is not set, control passes to block 145 to handle other exceptions, e.g., the task complete exception that is generated when the coprocessor has completed a task, or other exceptions generated by other system devices.

If the instruction trap flag is set, control passes to block 146, where the current operational state is retrieved from coprocessor 38 via the expansion bus. From this information, host processor 22 is able to process the exception instruction in block 148, typically using a known software interpreter which relies on the operational state of coprocessor 38 as its "virtual" operational state. Once the exception instruction is processed, the updated operational state is stored, via expansion bus 30, back into coprocessor 38 in block 150, the enable flag is set in block 152, and expansion bus 30 is released by host processor 22 in block 154, to in effect restart coprocessor 38 in the state it would expect to be in after execution of the exception instruction. Control then returns to handle the normal processing for host processor 22.

It should be appreciated that host processor 22 also has the ability to halt execution of coprocessor 38 at any time through control of the enable flag. This is required, for example, when a system reset is needed. Moreover, in some embodiments coprocessor 38 also has the ability to halt its execution rather than relying on host processor 22. For example, after executing block 124 or block 126 of FIG. 6, coprocessor 38 may clear the enable flag, thereby causing the coprocessor to return to halt mode 100.

In addition, after host processor 22 relinquishes control of bus 30 to coprocessor 38, it does not necessarily halt its own execution even though it does not have access to expansion bus 30. In particular, when host processor 22 includes a cache such as L1 cache 29, no system memory accesses may be immediately required, thereby enabling processors 22, 38 to run in parallel until an expansion bus access by processor 22 is required. In addition, it is believed that other manners of enabling processors 22, 38 to execute in parallel while locking-out the operational state of coprocessor 38 from access by host processor 22 may be utilized.

A number of advantages are obtained through the use of the various embodiments disclosed herein. For example, when coprocessor 38 is a Java coprocessor, it should be appreciated that computer system 10 is able to receive Java program code and process it with the same order of efficiency and performance expected for program code that is native to the host processor in the system (although one processor still may perform better than the other due to variations in design, clock speed, etc.). Thus, it will be appreciated that the benefits of the invention extend beyond Java bytecode acceleration.

Stack Cache

As discussed above, specific embodiments of the invention also include a stack cache 76 which improves the overall performance of a stack-based processor such as coprocessor 38 of FIG. 3. Specific embodiments of the invention operate by maintaining a contiguous group of stack entries in the stack cache 76 and pre-emptively rotating stack entries or blocks of stack entries at the ends of the contiguous group of stack entries between the cache and the system memory 28 such that stack operations by the processor are performed using the cache. When used in conjunction with any of the host/coprocessor systems disclosed above, the performance of the coprocessor 38 is accelerated, often bringing the performance of the coprocessor more in-line with that of host processor 22.

As shown in FIG. 3, stack 78 utilized for coprocessor 38 is stored in RAM 40. However, memory accesses to the stack are accelerated using a stack cache 76, which in the illustrated embodiment is a high speed cache memory (e.g., typically an on-board CMOS SRAM memory) that forms a circular array of cache entries arranged into segments. Stack cache 76 is disposed on the same integrated circuit device as coprocessor 38, or in other embodiments is disposed on a separate integrated circuit, and, for example, mounted on the same carrier such as a multichip module.

In the illustrated embodiment, each segment (designated A–D) in stack cache 76 includes 16 32-bit cache entries. The stack cache operates as a "moving window" to a contiguous group of stack entries stored in stack 78. The contents of the stack cache are frequently updated to in effect move the contiguous group with the stack pointer in the coprocessor 38.

A cache controller 70 controls stack cache 76 and includes DMA unit 72 and tag unit 74 coupled to expansion bus 30. DMA unit 72 handles block transfers between stack 78 in RAM 40 and stack cache 76, as well as handling memory accesses to cached portions of the stack that are requested by external devices such as host processor 22. DMA unit 72 includes a state machine to control the handling of these aforementioned functions. DMA unit 72 also restricts access to the stack cache 76 by host processor 22 when coprocessor 38 is in run mode. In addition, a stack flush flag and a stack initialization flag are maintained in block 56 (and thus are locked-out from host processor 22 when coprocessor 38 is in run mode) and monitored by DMA unit 72 to enable host processor 22 to respectively flush and re-initialize the stack cache 76 (as discussed below).

Tag unit 74 stores low and high address pointers, designated CacheLow and CacheHigh, which respectively store addresses pointing to the first and last stack entries in the contiguous group of stack entries maintained in stack cache 76. In response to a memory access request to a memory address between these two values (a "hit"), tag unit 74 invalidates the request through a control line to memory controller 42 to halt the memory controller from outputting the contents of the accessed location on expansion bus 30. Tag unit 74 also notifies DMA unit 72 through a separate control line so that the memory access request is instead handled by DMA unit 72. DMA unit 72 controls tag unit 74 through setting CacheLow and CacheHigh, as well as through an enable flag that disables the tag unit when no stack entries are being maintained in stack cache 76 (e.g., after a stack flush operation). In addition, tag unit 74 and/or DMA unit 72 may be configured to provide access control through rejecting any memory accesses (i.e., "locking out" the memory) or issuing an exception whenever a memory access is made to the stack cache while the coprocessor 38 is in a run mode.

Figure 8:
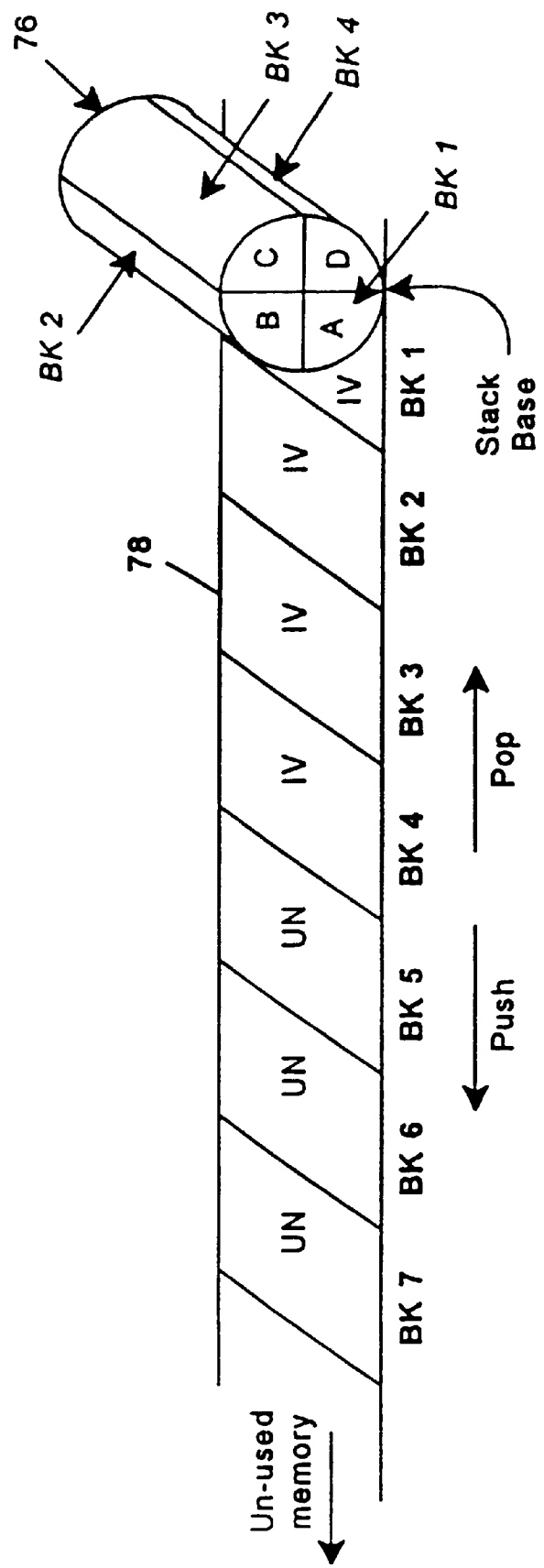
FIG. 8 is a functional diagram illustrating the interaction of the stack cache with a stack stored in the system memory, both of which are shown in FIG. 3.

As shown in FIG. 8, for example, stack cache 76 is a circular array of entries (segmented into segments A–D) which may be analogized to a "barrel" that rolls over the contents of stack 78. Upon initialization of the stack (typically by host processor 22 setting the stack base address register and the operand stack pointer (optop) register in block 56 of coprocessor 38—both of which will point initially to "stack base"), each block (e.g., BK 1–BK 7) in stack 78 is empty (designated "UN"). DMA unit 72 "invalidates" the first four blocks of entries in stack 78 (designated "IV") by setting CacheLow and CacheHigh in tag unit 74 to respectively point to the starting address of the first block and the ending address of the fourth block, whereby segments A–D in stack cache 76 reflect a copy of the contiguous group of stack entries in BK 1–BK 4. It should be appreciated that the "blocks" in stack 78 and the "segments" in stack cache 76 are the same number of entries, but are designated differently for illustrative purposes.

Once coprocessor 38 enters run mode, data (here operands) are pushed and popped on stack cache 76 as if it were memory starting in segment A down toward segment D. It will be appreciated that a stack underflow condition (where the stack pointer points below the base address of the stack) is an exception condition which is handled as described above by host processor 22 and coprocessor 38. In general, for push and pop operations, when the stack pointer crosses into a first end block in the contiguous group of stack entries, the IDMA unit flushes an opposite, second end block in the contiguous group of stack entries from the stack cache and retrieves a block of stack entries adjacent to the first end block into the stack cache.

A push operation is illustrated in FIG. 9 by a Push X routine 160 executed by DMA unit 72. First, DMA unit 72 in block 162 handles the push operation by storing the value to be pushed (here "X") in the cache at the top of the stack and incrementing the stack pointer register. Next, DMA unit 72 checks in block 164 whether the updated stack pointer has crossed a block boundary and is now in the highest block stored in the stack cache by checking if the stack pointer address added to the blocksize points to an address beyond the highest address of the stack cache (represented by CacheHigh). If it is not, then no further processing is required.

If this block boundary has been crossed, control passes to blocks 166 and 168 to exchange the entries stored in the lowest block in the stack cache 76 with the contents of the next block in the stack 78. In block 166, DMA unit 72 flushes the lowest block in stack cache 76 back to stack 78 via PFC bus 30 and updates CacheLow to point to the new lowest block in the stack cache (typically by adding the blocksize to CacheLow). Then, in block 168, the next block in stack 78 is retrieved into the segment where the previously lowest block was just flushed from stack cache 76 and CacheHigh is updated to point to the last address in this new block (typically by adding the blocksize to CacheHigh). Routine 160 is then complete.

As an example, FIG. 10(a) illustrates the conditions of stack cache 76 and stack 78 prior to the stack pointer crossing boundary 3 between stack cache segments C & D, where it is to be noted that stack cache segments A–D still have the same initial contents as shown in FIG. 8. As shown in FIG. 10(b), after the stack pointer crosses boundary 3 between stack cache segments C & D as the result of a push operation, routine 160 detects that the stack pointer plus the blocksize points to a stack entry in BK 5, which is greater than CacheHigh. BK 1, the lowest block in stack cache 76, is flushed to stack 78 and segment A, which previously stored BK 1, is updated with the contents of BK 5, the next block in stack 78. Moreover, CacheLow and CacheHigh are updated to now point, respectively, to the first entry in BK 2 and the last entry in BK 5. This operation in effect re-aligns segment A of stack cache 76 to "roll" after segment D as more data is pushed onto the stack.

Figure 11:
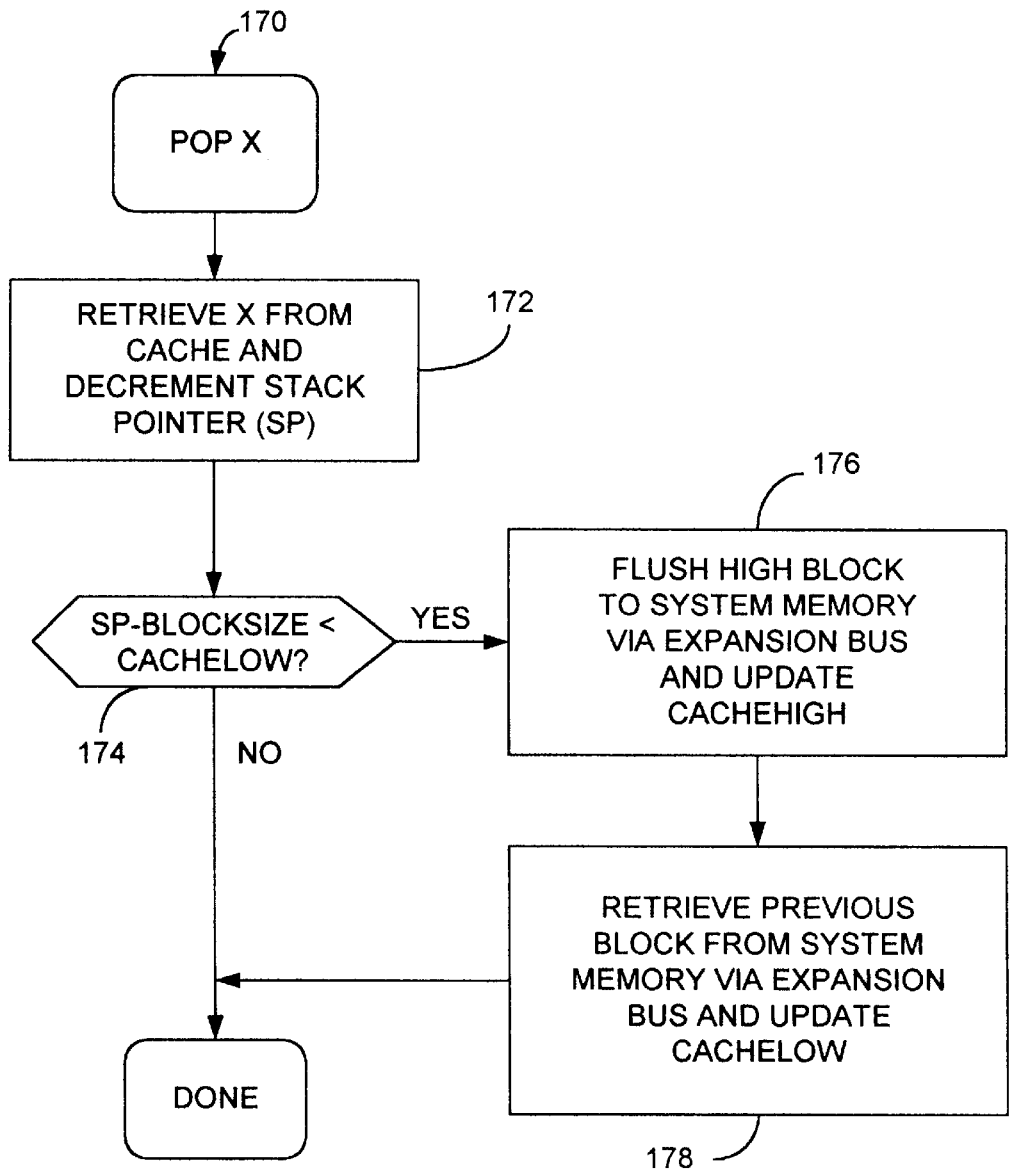
FIG. 11 is a flowchart illustrating one way, consistent with the present invention, to implement a pop routine executed on the cache controller of FIG. 3.
Figure 18:
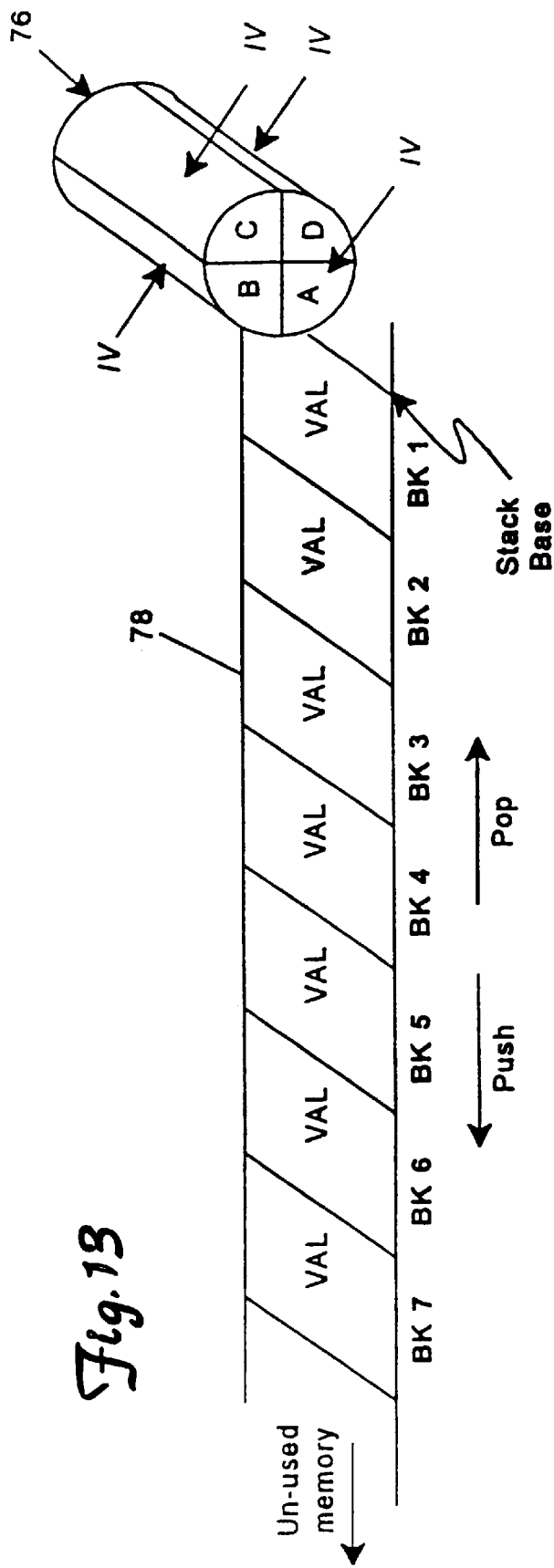

A pop operation is similar to a push operation and is illustrated in FIG. 11 by a Pop X routine 170 executed by DMA unit 72. In this routine, DMA unit 72 in block 172 handles the pop operation by retrieving the top value on the stack from the stack cache 76 and decrementing the stack pointer register. Next, DMA unit 72 checks in block 174 whether the updated stack pointer has crossed a block boundary and is now in the lowest block stored in the stack cache by checking if the stack pointer address less the blocksize points to an address beyond the lowest address of the stack cache (represented by CacheLow). If it is not, then no riser processing is required.

If this block boundary has been crossed, control passes to blocks 176 and 178 to exchange the entries stored in the highest block in the stack cache 76 with the contents of the previous block (or next lowest block) in the stack. In block 176, DMA unit 72 flushes the highest block in stack cache 76 back to stack 78 via expansion bus 30 and updates CacheHigh to point to the last address in the new highest block in the stack cache (typically by subtracting the blocksize from CacheHigh). Then, in block 178, the previous block in stack 78 is retrieved, via expansion bus 30, into the segment where the previously highest block was just flushed from stack cache 76 and CacheLow is updated to point to this new block (typically by subtracting the blocksize from CacheHigh). Routine 170 is then complete.

As an example, FIGS. 12(a) and 12(b) illustrate the conditions of stack cache 76 and stack 78 before and after a pop operation. As shown in FIG. 12(a), prior to the pop operation, the stack has been filled up to BK 7, whereby stack cache 76 has "rolled" to the point at which segment D contains BK 4, segment A contains BK 5, segment B contains BK 6 and segment C contains BK 7, whereby CacheLow points to the first entry in BK 4 and CacheHigh points to the last entry in BK 7. Then, as shown in FIG. 12(b), after the stack pointer crosses boundary 0 between stack cache segments D & A as a result of a pop operation, routine 170 detects that the stack pointer less the blocksize points to a stack entry in BK 3, which is less than CacheLow. BK 7, the highest block in stack cache 76, is flushed to stack 78 and segment C, which previously stored BK 7, is updated with the contents of BK 3, the previous block in stack 78. Moreover, CacheLow and CacheHigh are updated to now point, respectively, to the first entry in BK 3 and the last entry in BK 6. This operation in effect re-aligns segment C of stack cache 76 to "roll" after segment D as more data is popped from the stack.

FIG. 13 illustrates the result of a stack flush operation, which may be initiated by coprocessor 38, as well as by host processor 22 when coprocessor 38 is in a halt mode, by setting the stack flush flag in block 56. In a flush operation, DMA unit 72 flushes the contents of stack cache 76 to stack 78 and disables tag unit 74. Accordingly, as shown in this figure, all segments of stack cache 76 are invalidated and all of the contents of stack 78 are directly accessible from memory 28.

Initialization of the stack may be initiated by either processor 22, 38 (initiation by host processor 38 may only occur when coprocessor 22 is in halt mode) by providing DMA unit 72 with new CacheLow and CacheHigh values and setting the stack initialization flag in block 56. The CacheLow and CacheHigh values are provided to the DMA unit by writing the values to dedicated registers in block 56, whereby DMA unit 72 programs the new values into tag unit 74. Generally, no entries in the stack cache 76 need to be updated during stack initialization since in most instances the stack is empty upon initialization. However, should initial stack entries be required, either processor 40, 50 or DMA unit 72 may store appropriate stack entries into stack cache 76.

Through a combination of the above operations on stack cache 76, host processor 22 is capable of directly accessing and modifying the stack contents of coprocessor 38 during the halt mode to further set the initial operational state of coprocessor 38. However, it should also be appreciated that the various stack cache implementations discussed herein may be utilized in single processor computer systems, and consequently, some of the external access operations such as stack flush and stack initialization may not be required in some circumstances. Moreover, while the greatest benefits of the various stack cache implementations are obtained when utilized in conjunction with a stack-based processor such as for implementing the Java Virtual Machine Specification, other processors which are capable of utilizing or implementing a stack or other first-in-first-out (FIFO) data structure (which includes practically any processor), may also be used consistent with the invention.

Various modifications may be made to the illustrated embodiments without departing from the spirit and scope of the invention. For example, the size of each entry, as well as the size of each segment and the number of segments, in the stack cache may vary depending upon the application. Moreover, in certain applications, entries need not be broken into segments, and the contiguous group of entries maintained in the stack cache may be moved entry-by-entry, which may entail updating the stack cache after every push or pop operation. However, given that block transfer operations using a DMA are quite efficient, particularly when RAM 28 is implemented with memory devices optimized suited for such operations (e.g., EDO, BEDO or Synchronous DRAM, among others), processing segments of cache entries are expected to provide better performance.

Moreover, it should be noted that no header information or status flags (e.g., valid/invalid) are required for stack cache segments, since the actual modification of the stack contents during the run mode of the coprocessor 38 always occurs through the cache. In addition, cache coherency is typically not a concern for this reason. Status flags or other cache coherency protocols and processing may be used in the alternative.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A coprocessor arrangement for processing platform-independent program code, comprising:

an expansion bus interface circuit;

an instruction cache coupled to the expansion bus interface circuit;

a platform-independent code processing unit coupled to the instruction cache;

an internal control register coupled to the expansion bus interface circuit and having an input port for providing external access thereto, the control register arranged to provide an operational state for the processing unit; and a program counter register coupled to the expansion bus interface circuit and coupled to the platform-independent code processing unit, the program counter register arranged to store an address of a next platform-independent instruction to be processed.

2. The coprocessor arrangement of claim 1, wherein the expansion bus interface circuit is a PCI bus interface circuit.

3. The coprocessor arrangement of claim 1, wherein the platform-independent code processing unit is configured to process Java code.

4. The coprocessor arrangement of claim 1, wherein the platform-independent code processing unit is configured to process ActiveX controls.

5. A coprocessor arrangement for process ing platform-independent program code, comprising:
   interface means for providing access to an expansion bus;
   instruction cache means coupled to the interface means for providing and controlling cache storage of platform-independent program code;
   processing means coupled to the instruction cache means for processing platform-independent code;
   an internal control register coupled to the interface means and having an input port for providing external access thereto, the control register for providing an operational state for the processing means; and
   a program counter register coupled to the interface means and coupled to the processing means for referencing an address of a next platform-independent instruction to be processed.

6. The coprocessor arrangement of claim 5, wherein the expansion bus interface circuit is a PCI bus interface circuit.

7. The coprocessor arrangement of claim 5, wherein the control unit is configured to process Java code.

8. The coprocessor arrangement of claim 5, wherein the control unit is configured to process ActiveX controls.

9. The coprocessor arrangement of claim 5, filter comprising a first externally accessible control bit coupled to the expansion bus interface circuit for switching the coprocessor between a first state of executing the platform-independent code and a second state of not executing the platform-independent code.

10. The coprocessor arrangement of claim 9, filter comprising a task-complete register coupled to the expansion bus interface circuit for indicating when the coprocessor has completed a task.

11. The coprocessor of claim 5, further comprising means, coupled to the expansion bus interface circuit, for indicating an exception condition.

12. The coprocessor of claim 11, wherein the means for indicating includes a second externally accessible control bit coupled to the expansion bus interface circuit and coupled to the control unit for indicating when the control unit cannot process a particular platform-independent instruction.

13. The coprocessor of claim 5, wherein the control unit is stack-based.

14. The coprocessor of claim 13, further comprising a stack cache circuit arrangement coupled to the control unit for caching stack entries referenced by the control unit.

15. The coprocessor of claim 14, wherein the stack cache circuit arrangement includes:
   a stack cache memory coupled to the control unit for cache storage of stack entries; and
   a stack cache controller coupled to the stack cache memory and coupled to the control unit for controlling caching of stack entries.

16. A computer system, comprising:
   a local bus;
   a host processor coupled to the local bus for managing execution of platform-independent code;
   a memory coupled to the local bus for storing the platform-independent code;
   an expansion bus bridge coupled to the local bus;
   an expansion bus coupled to the expansion bus bridge; and
   a coprocessor coupled to the expansion bus for processing the platform-independent code as directed by the host processor, the coprocessing including,
      an expansion bus interface circuit;
      an instruction cache coupled to the expansion bus interface circuit;
      a platform-independent code processing unit coupled to the instruction cache;
      an internal control register coupled to the expansion bus interface circuit and having an input port for providing external access thereto, the control register for providing an operational state for the coprocessor; and
      a program counter register coupled to the expansion bus interface circuit and coupled to the platform-independent code processing unit for referencing an address of a next platform-independent instruction to be executed.

17. The computer system of claim 16, wherein the expansion bus is a PCI bus.

18. The computer system of claim 16, wherein the platform-independent code processing unit is configured to process Java code.

19. The computer system of claim 16, wherein the platform-independent code processing unit is configured to process ActiveX controls.

20. A computer system, comprising:
   a local bus;
   a host processor coupled to the local bus for managing execution of platform-independent code;
   a memory coupled to the local bus for storing the platform-independent code;
   an expansion bus bridge coupled to the local bus;
   an expansion bus coupled to the expansion bus bridge; and
   a coprocessor coupled to the expansion bus for processing the platform-independent code as directed by the host processor, the coprocessing including,
      interface circuit means for providing access to the expansion bus;
      instruction cache means coupled to the interface means for providing and controlling cache storage of the platform-independent program code;
      processing means coupled to the instruction cache for executing the platform-independent code;
      an internal control register coupled to the interface means and having an input port for providing external access thereto, the control register for providing an operational state for the coprocessor; and
      a program counter register coupled to the interface means and coupled to the control unit for referencing an address of a next platform-independent instruction to be executed by the processing means.

21. The computer system of claim 20, wherein the expansion bus is a PCI bus.

22. The computer system of claim 20, wherein the control unit is configured to process Java code.

23. The computer system of claim 20, wherein the control unit is configured to process ActiveX controls.

24. The computer system of claim 20, wherein the coprocessor further includes a first externally accessible control bit coupled to the expansion bus interface circuit for switching the coprocessor between a first state of executing the platform-independent code and a second state of not executing the platform-independent code.

25. The computer system of claim 20, wherein the coprocessor further includes a task-complete register coupled to the expansion bus interface circuit for indicating when the coprocessor has completed a task.

26. The computer system of claim 20, wherein the coprocessor further includes means, coupled to the expansion bus interface circuit, for indicating an exception condition.

27. The computer system of claim 26, wherein the means for indicating includes a second externally accessible control bit coupled to the expansion bus interface circuit and coupled to the control unit for indicating when the control unit cannot process a particular platform-independent instruction.

28. The computer system of claim 20, wherein the control unit is stack-based.

29. The computer system of claim 24, wherein the coprocessor further includes a stack cache circuit arrangement coupled to the control unit for caching stack entries referenced by the control unit.

30. The computer system of claim 25, wherein the stack cache circuit arrangement includes:
   a stack cache memory coupled to the control unit for cache storage of stack entries; and
   a stack cache controller coupled to the stack cache memory and coupled to the control unit for controlling caching of stack entries.

31. A method for processing platform independent code, comprising the steps of:

(a) receiving platform-independent code at a host processor;

(b) storing the platform-independent code in a memory;

(c) transmitting an activation signal addressed to a coprocessor from the host processor to an expansion bus bridge;

(d) transmitting the activation signal from the bridge to the coprocessor via an expansion bus;

(e) activating the coprocessor in response to the activation signal; and (f) processing the platform-independent code by the coprocessor.

32. The method of claim 31, wherein the transmitting step (c) includes the step of transmitting the activation signal to a PCI bridge.

33. The method of claim 32, wherein the transmitting step (d) includes the step of transmitting the activation signal to the coprocessor via a PCI bridge.

34. The method of claim 31, wherein the activating step includes the steps of:

(g) storing activation state information in an internal control register of the coprocessor; and (h) storing program counter value in an internal program counter register of the coprocessor.

35. The method of claim 34, further comprising the step of setting an instruction trap flag in the coprocessor when the coprocessor encounters an instruction that cannot be processed.

36. The method of claim 34, further comprising the step of setting a task complete flag in the coprocessor when the coprocessor has completed a task.

\* \* \* \* \*

UNITED STATES PATENT AND TRADEMARK OFFICE
CERTIFICATE OF CORRECTION

PATENT NO. : 5,923,892

DATED : July 13, 1999

INVENTOR(S): Levy

It is certified that error appears in the above-identified patent and that said Letters Patent is hereby corrected as shown below:

Col. 7, line 8: "fifem" should read --fmem--.

Signed and Sealed this

Twenty-seventh Day of March, 2001

Attest:

NICHOLAS P. GODICI

Attesting Officer

Acting Director of the United States Patent and Trademark Office